H. E. BAYLY.
STEERING DEVICE.
APPLICATION FILED DEC. 17, 1909.
979,411.
Patented Dec. 27, 1910.
2 SHEETS—SHEET 1.
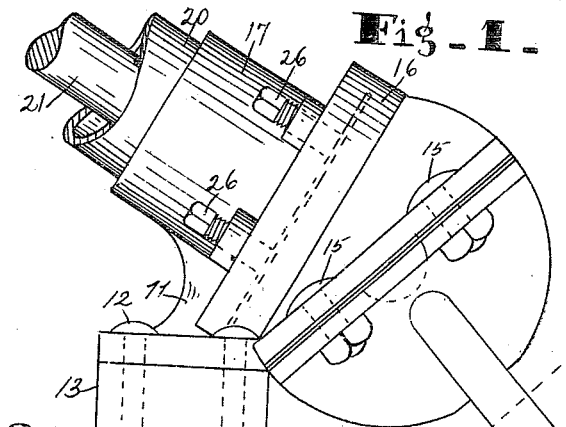
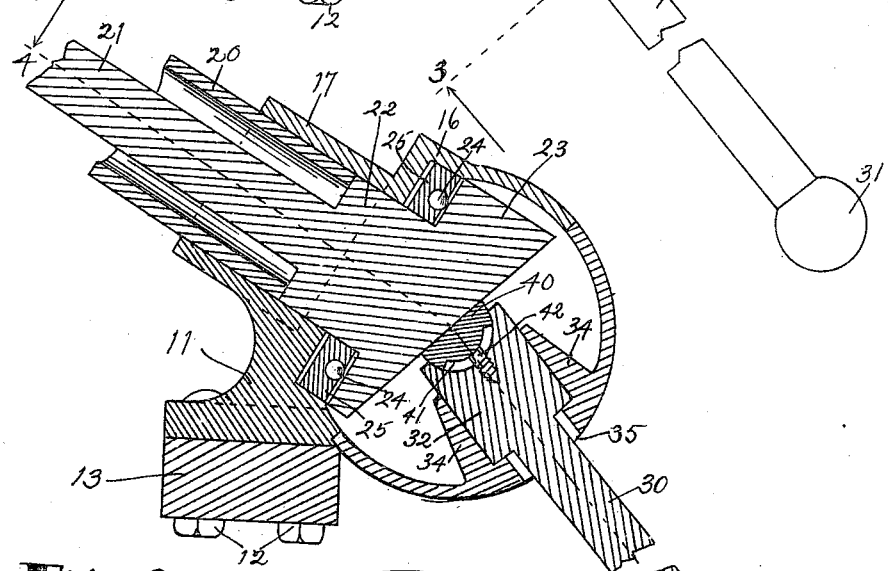
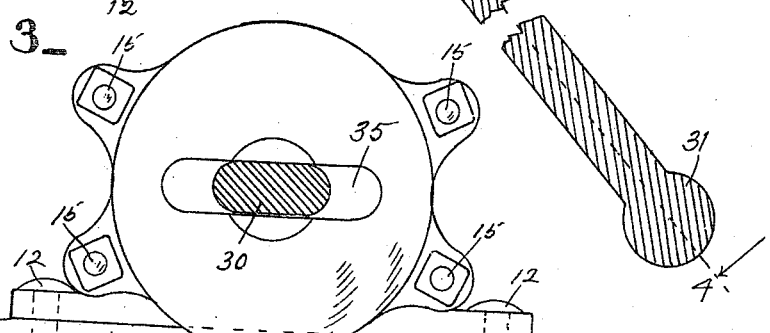
WITNESSES:
O. M. McLaughlin
W. M. Gentle
INVENTOR.
Harry E. Bayly.
BY
V. H. Lockwood
ATTORNEY.

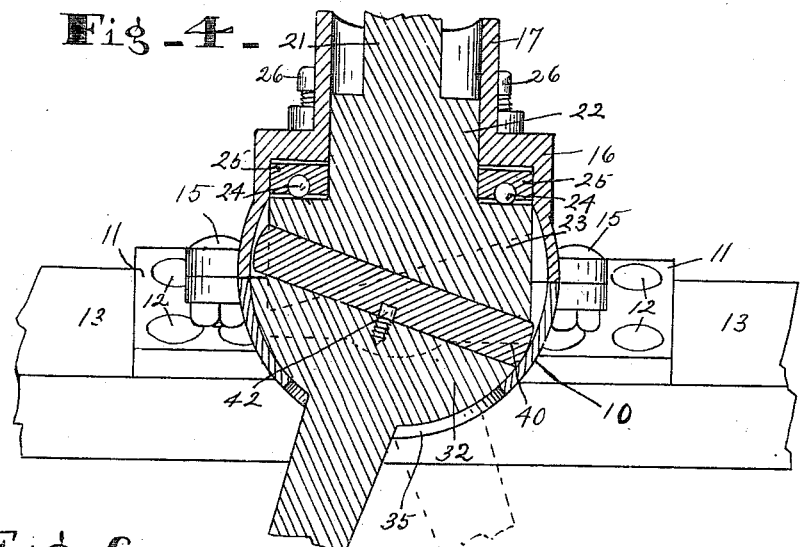
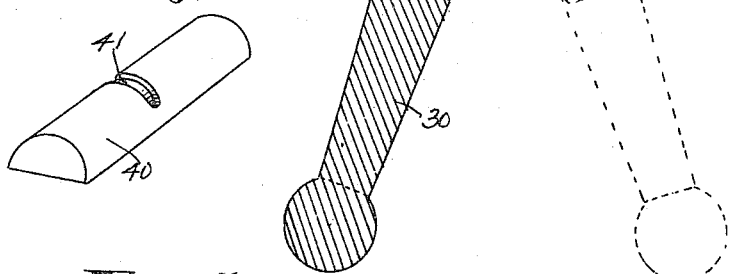
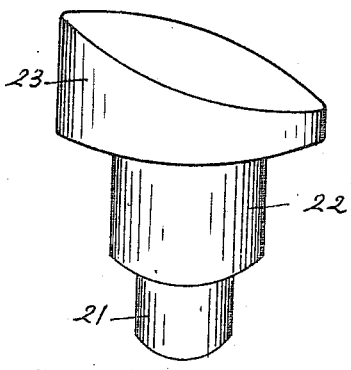
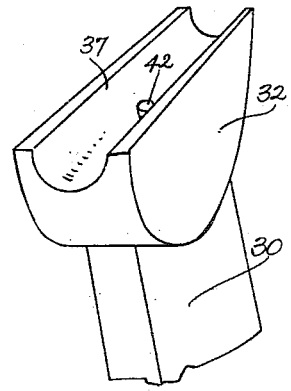

UNITED STATES PATENT OFFICE.

HARRY E. BAYLY, OF INDIANAPOLIS, INDIANA, ASSIGNOR OF ONE-THIRD TO RAYMOND G. BURLINGAME AND ONE-THIRD TO HARRY M. McCORMACK, OF INDIANAPOLIS, INDIANA.

STEERING DEVICE.

979,411.　　　　　Specification of Letters Patent.　　Patented Dec. 27, 1910.

Application filed December 17, 1909.　Serial No. 533,653.

*To all whom it may concern:*

Be it known that I, HARRY E. BAYLY, of Indianapolis, county of Marion, and State of Indiana, have invented a certain new and useful Steering Device; and I do hereby declare that the following is a full, clear, and exact description thereof, reference being had to the accompanying drawings.

The object of this invention is to provide an improved steering apparatus for automobiles and the like, which is easy to operate, is positive in its transmission of power and movement of parts, simple in construction, and can be kept tightened up as it wears, so that there will be no looseness or play of the steering apparatus.

The chief feature of the invention consists in providing a head on the lower end of the steering shaft having a plain cam surface extending transversely of the axis of the shaft and at an acute angle to a plane cutting the axis of the shaft at a right angle.

Another feature consists in providing a rocking lever adapted to be connected with the wheels to be steered, and the upper end of which is in frictional engagement with said cam surface, so that if the cam surface is oscillated on the axis of the steering shaft, it will give a rocking or oscillating movement to said lever.

Another feature consists in providing a casing preferably spherical which incloses the upper end of said lever and the cam head of the steering shaft and provided with means for tightening said parts together when desired so as to avoid any friction.

The nature of the invention will be understood from the accompanying drawings and the following description and claims.

In the drawings Figure 1 is a side elevation of said steering apparatus with the upper part of the steering shaft and tube broken away, and with a lever centrally broken away. Fig. 2 is a central vertical section through Fig. 1. Fig. 3 is a section on the line 3—3 of Fig. 1 and showing the bottom view of the casing. Fig. 4 is a section on a plane transversely of the section shown in Fig. 2, that is, on the line 4—4 of Fig. 2 with an altered position of the parts in dotted lines. Fig. 5 is a perspective view of the cam on the end of the steering shaft, the latter being partly broken away. Fig. 6 is a plan view of a semi-cylindrical member between the cam on the steering shaft and the head of the lever. Fig. 7 is a perspective view of the head of the lever and the adjacent portion of the lever. the lower part thereof being broken away.

In the drawings there is shown a substantially spherical casing or shell 10 which is connected with or may form a part of the frame 11 that is secured to the bolts 12 of a bar 13 which extends transversely of the frame of the automobile. However, the part 11 may be secured in any suitable manner so as to hold the casing 10 substantially in the position shown. This casing is made of two parts, the lower and upper, and they have ears on each side which are secured together by the bolts 15. The upper part is only partly spherical, it having an enlarged upwardly extending bearing portion 16 and a reduced bearing portion 17 extending upwardly therefrom. The housing tube 20 is secured in the upper extension 17 of the casing, as shown in Fig. 2. The steering shaft 21 projects through said tube 20, having a steering wheel on the upper end, not shown, and at the lower end said shaft has an enlarged portion 22 that has bearing in the extensions 16 and 17 and projects into the shell 10 and has on the lower end thereof a cam heads or portion 23, said parts 21, 22 and 23 being shown integral. The cam head 23 is of larger diameter than the part 22 above it, and upon its enlarged portion a series of balls 24 are located that are in a ball-race in the bearing ring 25 that lies within the portion 16 of the casing. This constitutes a ball bearing between the casing and the cam head 23, and said cam head is forced down to its work by adjusting screws 26 that operate through the casing, as shown in Fig. 1. The cam surface on the portion 23 is a flat surface extending at a slight angle, about twenty degrees, from a plane perpendicular to the axis of the steering shaft.

The lever 30 has on its lower end a ball 31 or any formation whereby it may be connected with the parts running to the wheels to be steered. At its upper end said lever is provided with an elongated head 32, see Fig. 7, that is flat on its sides, and the ends and lower portion are cylindrical, and it is of greater thickness than the lever 30, as seen in Fig. 2, so that it fits and operates in a correspondingly shaped recess in the upwardly extending bearing portion 34 in the casing or shell 10, and said shell 10 is provided with a transversely extending slot 35, through which said lever 30 projects. Hence said lever 30 is adapted to be moved or oscillated laterally, as shown in Fig. 4, within the bearing portion 34. The head 32 on the lever 30 is provided with a semi-cylindrical socket or recess 37 extending transversely of the device and longitudinally of the head 32, as shown in Fig. 7, and in this socket a semi-cylindrical transversely rocking bearing member 40 is loosely placed. The form of that member is shown in Fig. 6. It has a flat upper surface and a cylindrical lower surface and in the lower surface there is a recess 41 transversely of it into which the pin 42 from the head 32 loosely projects. The purpose of the pin and slot is to prevent any tendency of the member 40 having longitudinal movement. The cam surface on the lower end of the steering shaft bears flatly against the flat upper surface of the intermediate member 40, as shown in Fig. 2, and the lever 30 preferably projects away from the lower end of the steering shaft at an angle of about twenty degrees, considered with reference to a line in continuation of the axis of said shaft, as shown in Fig. 2, but said lever normally lies in the same vertical plane as the steering shaft, that is, in a position midway between the two positions shown for said lever in Fig. 4.

In operation, when the steering shaft is oscillated slightly to the left, the lever will be thrown from its straight position to the full-line position shown in Fig. 4, that is, to the right, for such left-hand movement of the steering shaft will turn the cam head from the normal position shown in Fig. 2 to that shown in Fig. 4, and the cam head will cause a corresponding but opposite oscillatory movement of the head on the lever 30 and of the intermediate member 40, as shown in Fig. 4. An opposite oscillation of the steering shaft, namely, turning it to the right, will turn the cam head to the dotted-line position shown in Fig. 4, which will throw the lever to the left to the dotted-line position. Hence slight oscillatory movements of the steering shaft from one side to the other will cause the oscillatory movement of the lever 30 and steer the apparatus as desired. The normal position of the cam head may be modified from that shown in Fig. 2.

I claim as my invention—

1. A steering apparatus including a steering shaft with a cam head having an oblique surface on the extreme end thereof, a casing surrounding said cam head, a lever with one end oscillatably mounted in said casing, and a transversely rocking bearing member intermediate said end of the lever and the cam head on the steering shaft.

2. A steering apparatus including a steering shaft with a cam head having an oblique surface on the extreme end thereof, a spherically disposed casing surrounding said cam head with a slot in the portion remote from said cam head, and a bearing portion projecting inwardly toward said head which bearing portion has a concave recess, a lever with one end projecting through said slot in said casing and with its inner end enlarged and convex so as to fit and rock in the recess in said bearing portion of the casing and with a semi-cylindrical socket in the extreme inner surface of said lever, an intermediate semi-cylindrical member with the convex surface thereof fitting loosely in said socket and with a flat surface bearing against said oblique surface of the cam head.

3. A steering apparatus including a steering shaft with a cam head having an oblique surface on the extreme end thereof, a spherically disposed casing surrounding said cam head with a slot in the portion remote from said cam head, and a bearing portion projecting inwardly toward said head which bearing portion has a concave recess, a lever with one end projecting through said slot in said casing and with its inner end enlarged and convex so as to fit and rock in the recess in said bearing portion of the casing and with a semi-cylindrical socket in the extreme inner surface of said lever, an intermediate semi-cylindrical member with the convex surface thereof fitting loosely in said socket and with a flat surface bearing against said oblique surface of the cam head, and means coöperating with the upper portion of the casing for holding the parts in snug engagement with each other.

4. A steering apparatus including a steering shaft with a cam head having an oblique surface on the extreme end thereof, a spherically disposed casing surrounding said cam head with a slot in the portion remote from said cam head, and a bearing portion projecting inwardly toward said head which bearing portion has a concave recess, a lever with one end projecting through said slot in said casing and with its inner end enlarged and convex so as to fit and rock in the recess in said bearing portion of the casing and with a semi-cylindrical socket in the extreme inner surface of said lever, an intermediate semi-cylindrical member with the convex surface thereof fitting loosely in said socket and with a flat surface bearing against said oblique surface of the cam head and having a transverse slot in the underside thereof, and a pin in the inner end of the lever which projects into said slot so as to permit transverse movement of said intermediate member.

In witness whereof, I have hereunto affixed my signature in the presence of the witnesses herein named.

HARRY E. BAYLY.

Witnesses:
G. H. BOINK,
O. M. McLAUGHLIN.